United States Patent
Raghavan et al.

(10) Patent No.: US 12,541,550 B2
(45) Date of Patent: Feb. 3, 2026

(54) CONTENT RECOMMENDATIONS BASED ON CONSUMPTION STATUS

(71) Applicant: Motorola Mobility LLC, Chicago, IL (US)

(72) Inventors: Krishnan Raghavan, Bangalore (IN); Nakul Patel, Bangalore (IN); Ashok Oliver Prabhu, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/650,622

(22) Filed: Apr. 30, 2024

(65) Prior Publication Data

US 2025/0335495 A1 Oct. 30, 2025

(51) Int. Cl.
*G06F 16/435* (2019.01)
*G06F 16/438* (2019.01)

(52) U.S. Cl.
CPC .......... *G06F 16/435* (2019.01); *G06F 16/438* (2019.01)

(58) Field of Classification Search
CPC .............................. G06F 16/435; G06F 16/438
USPC ......................................................... 707/722
See application file for complete search history.

(56) References Cited

U.S. PATENT DOCUMENTS

| 2009/0234735 A1* | 9/2009 | Maurer | G06Q 30/0269 |
| | | | 705/14.66 |
| 2012/0151383 A1* | 6/2012 | Kazan | G06Q 10/101 |
| | | | 715/753 |
| 2012/0290637 A1* | 11/2012 | Perantatos | G06Q 10/10 |
| | | | 709/203 |
| 2013/0080266 A1* | 3/2013 | Molyneux | G06Q 10/00 |
| | | | 715/234 |
| 2014/0304338 A1* | 10/2014 | Lee | G06Q 50/01 |
| | | | 709/205 |

OTHER PUBLICATIONS

Aizenbud-Reshef et al. "Collaborative Feed Reading in a Community." Group'09, May 10-13, 2009. ACM. https://dl.acm.org/doi/pdf/10.1145/1531674.1531716 (Year: 2009).*

* cited by examiner

Primary Examiner — Kimberly L Wilson
(74) Attorney, Agent, or Firm — FIG. 1 Patents

(57) ABSTRACT

Techniques for content recommendations based on consumption status are described and are implementable to generate digital identity groups within a content aggregation application and transmit digital content based on content consumption behavior of the digital identity group. For instance, a digital identity group is generated that includes a first digital identity of a user of the computing device and a second digital identity of an additional user of an additional computing device. Candidate digital content is identified to transmit to the computing device based on one or more digital attributes associated with the first digital identity. The client device then determines whether the candidate digital content is a duplicative instance of digital content based on content consumption of the digital identity group. If the candidate digital content is duplicative, the client device identifies alternative digital content for display by the client device.

20 Claims, 9 Drawing Sheets

CONTENT RECOMMENDATIONS BASED ON CONSUMPTION STATUS

BACKGROUND

With the proliferation of the internet and digital devices and services, enormous amounts of data are generated every second. Using various data mining techniques, valuable insights can be extracted from this data to understand user preferences, behaviors, and interests. Accordingly, personalized content has become commonplace in the digital realm. However, personalized content delivery can lead to phenomena such as "echo chambers" where users are exposed to homogenized content, limiting exposure to diverse perspectives, and diminishing the user experience.

BRIEF DESCRIPTION OF THE DRAWINGS

Aspects of content recommendations based on consumption status are described with reference to the following Figures. The same numbers may be used throughout to reference similar features and components that are shown in the Figures.

DETAILED DESCRIPTION

Figure 1:
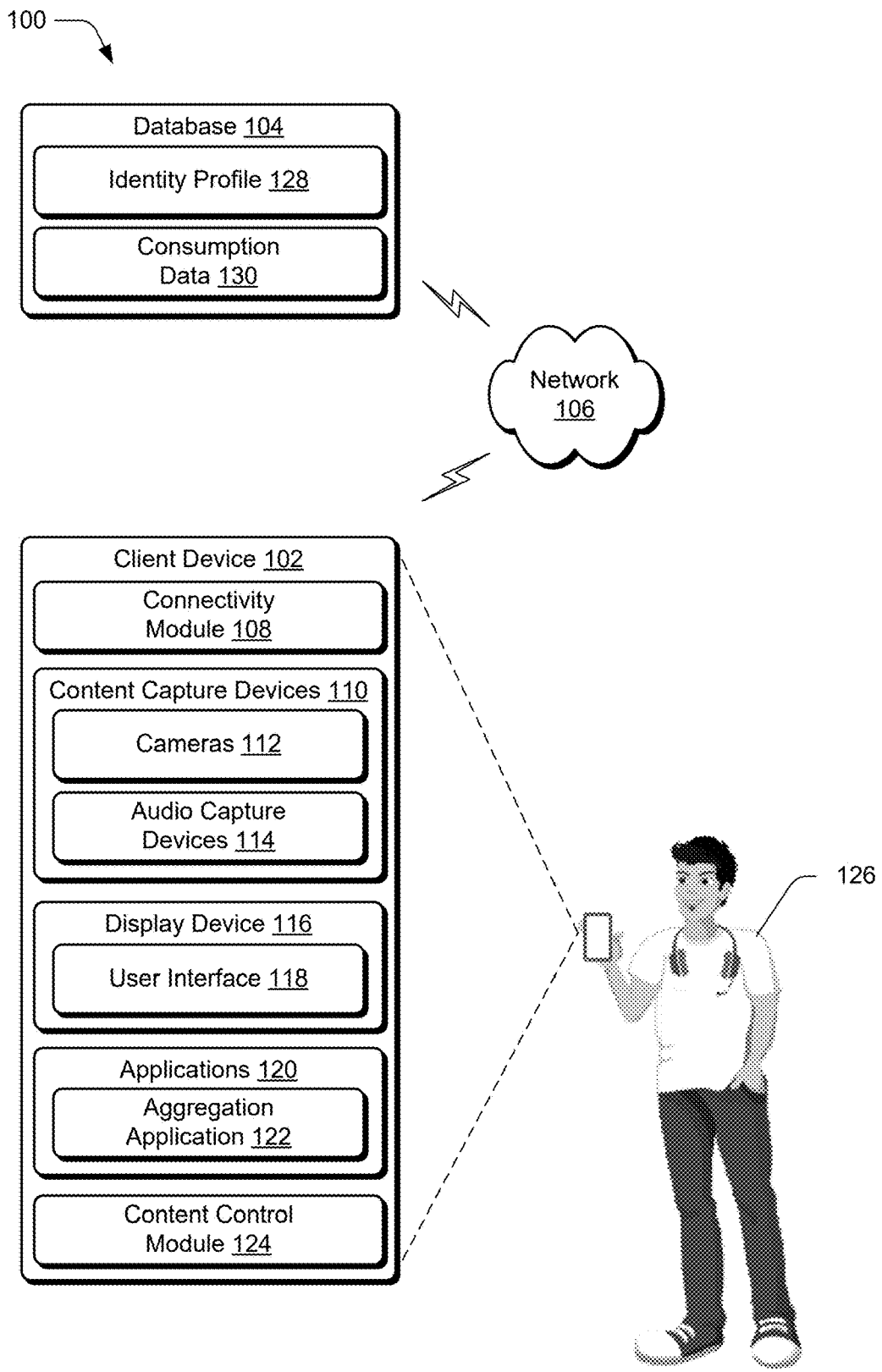
FIG. 1 illustrates an example environment in which aspects of content recommendations based on consumption status can be implemented.

Techniques for content recommendations based on consumption status are described and are implementable to generate digital identity groups within a content aggregation application and transmit digital content to a user based on digital attributes associated with a user as well as on a consumption status of the digital content. The described implementations can recommend digital content, such as a digital document, to a user based on digital attributes associated with the user as well as on whether or not other users within the digital identity group have consumed the digital content, e.g., whether or not the other users have accessed the digital document.

Consider an example in which a group of students regularly meet to discuss recent scientific discoveries. Using conventional content delivery techniques, the students each receive personalized content such as articles tailored to the students' interests. However, the students are like-minded and accordingly often receive the same articles. Thus, conventional techniques inadvertently limit exposure to diverse content and cause user dissatisfaction at homogenization of digital content. Further, conventional techniques experience computational redundancies in delivering repeat instances of digital content and thus waste computational resources.

To overcome these limitations, the techniques described herein support content recommendations to a user based on a consumption status of an instance of digital content as well as on digital attributes associated with the user. In an example, a client device receives an input to launch a content aggregation application. Generally, the content aggregation application gathers digital content from various digital sources and presents selected instances of digital content in a unified interface. A variety of content aggregation applications are considered, such as news aggregators that compile news articles, social media aggregators that gather various social media postings, video aggregators that compile digital videos from various platforms, audio aggregators that compile various audio content (e.g., podcasts, music, audiobooks, etc.) and so forth. Continuing with the above example, the content aggregation application is a news aggregator that collects news articles from various sources for display in a centralized location.

As part of the content aggregation application, the client device aggregates a set of digital identities to generate a digital identity group. The digital identity group, for instance, includes a first digital identity of a user of the computing device and at least one additional digital identity of an additional user of an additional computing device. The digital identity group enables members of the group to participate in a shared content consumption experience. In the example, the digital identity group includes a first digital identity for a user of the client device "Alice" as well as digital identities for the other students. As a member of the digital identity group, Alice is able to view articles that the other students have read as further described below.

The client device identifies candidate digital content, e.g., a digital article, to transmit to the computing device based on an identity profile associated with the first digital identity. The identity profile describes one or more digital attributes that include a variety of information about the user and/or the client device such as user demographics, behavioral data, user preferences, hardware specifications of the client device, operating system information, etc. Accordingly, the client device can identify candidate digital content that is likely of interest to the user based on the identity profile. For example, the identity profile associated with Alice indicates past interaction (e.g., likes, shares, views, etc.) with articles that pertain to science. Accordingly, the client device identifies a candidate article that pertains to groundbreaking gene therapy.

The client device then determines whether the candidate digital content is a duplicative instance of digital content. Generally, a duplicative instance of digital content refers to digital content that has been consumed by one or more of the additional users of the digital identity group. For instance, the client device accesses a database that includes consumption data for the digital identity group. The consumption data includes a digital activity indicator that indicates a consumption status for each instance of digital content that is consumed (e.g., accessed, watched, read, listened to, viewed, etc.) by the members of the digital identity group. For example, once a user of the digital identity group views an article, the client device can update a consumption status to indicate that the article has been viewed.

In an example in which the candidate digital content has not been viewed by another user of the digital identity group, the client device generates a content feed for display that includes the candidate digital content, such as a digital content feed that includes the candidate article. In some examples, the client device may generate an indication that the candidate digital content has not been consumed by another user in the digital identity group. In this way, the client device ensures that the user is provided with a unique instance of digital content, such as an article that has not been read by other members of the digital identity group.

However, in an example in which the candidate digital content has been consumed by another user of the digital identity group, the client device obtains an instance of alternative digital content that has one or more shared digital characteristics to the candidate digital content. In an example in which the candidate digital content includes digital video and/or digital images, for instance, the shared digital characteristics include a visual and/or audial similarity. Alternatively or additionally, in an example in which the candidate digital content includes text-based digital content, the client device is configured to identify the alternative digital content based a semantic similarity to the candidate digital content, such that the alternative digital content and candidate digital content pertain to a same topic.

The client device, for instance, is configured to determine a topic of the candidate digital content using a variety of techniques, such as using keyword extraction, one or more topic modeling algorithms, named entity recognition, one or more text recognition algorithms, etc. Continuing with the above example, consider that another user of the student group, "Rosie," has read the candidate article. Accordingly, the client device identifies an alternative article that pertains to the gene therapy research, however is authored by a different source.

In some examples, the alternative article is further based on a diversity value. Generally, the diversity value controls "how similar" the alternative article is to the candidate article. In one example, a relatively low diversity value corresponds to a "more similar" article while a relatively high diversity value corresponds to a "more diverse" article. In this way, the variation between articles of the same topic provided to members of the digital identity group is customizable.

Once the client device has identified the alternative digital content, the client device displays a content feed that includes the alternative digital content. For instance, the client device includes the alternative article in a news feed displayed in a user interface of the client device. In some examples, the client device generates an indication for display in the user interface that the alternative digital content replaced the candidate digital content. The client device may further indicate that a particular digital identity of the digital identity group consumed the candidate digital content. In this example, the client device generates an indication that Rosie viewed the candidate article.

Accordingly, the techniques described herein overcome the limitations of conventional content recommendation techniques that recommend identical instances of digital content to similar users within a group, resulting in user dissatisfaction. Further, the techniques described herein enable detection and correction of errant (e.g., duplicate) content delivery. For instance, content aggregation involves generating, transmitting, and processing various types of data across a variety of different systems and networks. Thus, content aggregation can be characterized as sets of computational operations much like other operations of a computing device and/or set of computing devices.

Accordingly, by enabling the detection and prevention of duplicative content delivery, such as within groups of user devices, the described techniques can conserve system resources (e.g., memory, processor bandwidth, network bandwidth, etc.) that may otherwise be needlessly expended during communication, transmission, and rendering of such duplicate content. Thus, the described techniques can improve the operation of computing devices and data networks. Further, user burden can be reduced by performing such processes automatically while reducing user interaction to initiate and manage the processes.

While features and concepts of content recommendations based on consumption status can be implemented in any number of environments and/or configurations, aspects of content recommendations based on consumption status are described in the context of the following example systems, devices, and methods.

FIG. 1 illustrates an example environment 100 in which aspects of content recommendations based on consumption status can be implemented. The environment 100 includes a computing device such as a client device 102 and a database 104 that are interconnectable via network(s) 106. In the illustrated example, the client device 102 represents a mobile device, such as a smartphone or a tablet device. These examples are not to be construed as limiting, however, and the client device 102 can be implemented in a variety of different ways and form factors such as a laptop computer, desktop computer, webcam, a docked mobile device connected to a monitor, and so forth. Example attributes of the client device 102 are discussed below with reference to the device 900 of FIG. 9.

While in the illustrated example the database 104 is depict as connected to the client device via the network 106, in various examples the database 104 and client device 102 are connectable via wired and/or wireless connectivity to exchange information between the database 104 and the client device 102. In a wireless scenario, the client device 102 and the database are connected utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth. In alternative or additional examples, the database 104 is implemented in hardware of the client device 102.

The client device 102 includes various functionality that enables the client device 102 to perform different aspects of content recommendations based on consumption status discussed herein, including a connectivity module 108, content capture devices 110 including cameras 112 and audio capture devices 114, a display device 116 including a user interface 118, applications 120 including an aggregation application 122, and a content control module 124. The connectivity module 108 represents functionality (e.g., logic and hardware) for enabling the client device 102 to interconnect with other devices, storage systems, and/or networks, such as the network 106 and the database 104. The connectivity module 108, for instance, enables wireless and/or wired connectivity of the client device 102.

The content capture devices 110 are representative of functionality to enable various types of media to be captured via the client device 102, such as visual media and audio media. In this particular example the content capture devices 110 include photo/video capture devices such as cameras 112 and audio capture devices 114. The content capture devices 110, however, can include a variety of other devices that are able to capture various types of media in accordance with the implementations discussed herein. The content capture devices 110, for instance, include not only hardware for capturing associated media but also logic (e.g., drivers, firmware, etc.) for operating and configuring operation of the associated content capture devices 110. The display device 116 represents functionality (e.g., hardware and logic) for enabling visual output via the client device 102 such as via the user interface 118.

The applications 120 represent functionality for performing different computing tasks via the client device 102, such as health tracking (e.g., fitness activity tracking), gaming, media consumption (e.g., content streaming), productivity tasks (e.g., email, calendar management, word processing, content generation, data analysis, etc.), content generation, web browsing, communication with other devices, and so forth. The applications 120 include an aggregation application 122 which represents functionality for performing various aspects of content recommendations based on consumption status. Generally, the aggregation application 122 gathers content from various digital sources and presents selected instances of digital content in the user interface 118. A variety of aggregation applications 122 are considered that gather a variety of digital content, such as news aggregation applications that compile news articles, social media aggregation applications that gather various social media postings, video aggregation applications that compile digital videos from various platforms, content consumption aggregation applications that aggregate content consumption statistics, etc. The aggregation application 122 can further gather and display a combination of a variety of types of digital content.

The content control module 124 represents functionality for performing various aspects of content recommendations based on consumption status described herein. The content control module 124, for instance, can launch the aggregation application 122 in the user interface 118, such as responsive to an input to do so. The content control module 124 further generates a digital identity group that includes a digital identity associated with a user 126 of the client device 102 and an additional digital identity associated with an additional user of an additional client device.

The content control module 124 identifies a candidate instance of digital content to recommend to the user 126, such as based on an identity profile 128 maintained in the database 104. The identity profile 128, for instance, includes one or more digital attributes associated with the digital identity for the user 126. The digital attributes, for instance, include a variety of information about the user 126 such as user demographics, behavioral data, or user preferences. The digital attributes may alternatively or additionally include information about the client device 102, such as operating system information, hardware specifications (e.g., RAM specifications, storage capacity, graphics capabilities, etc.), system logs, application data, browser history/cookie information, sensor data, etc. Accordingly, the client device 102 can identify a candidate instance of digital content that is likely of interest to the user 126 based on a variety of digital attributes associated with the digital identity.

The content control module 124 further determines whether the candidate instance of digital content is a duplicative instance of digital content, e.g., whether or not the candidate instance of digital content has been consumed by one or more of the additional client devices. For instance, the database 104 includes consumption data 130 that includes a digital activity indicator that indicates whether or not a particular instance of digital content has been consumed (e.g., read, viewed, watched, etc.) by a member of the digital identity group. Alternatively or additionally, the digital activity indicator is associated directly with the candidate instance of digital content, such as embedded in metadata of the candidate instance of digital content.

If the candidate instance of digital content has not been consumed by the additional computing device (e.g., by another member of the digital identity group), the client device 102 includes the candidate instance of digital content in a content feed for display in the user interface 118, such as within the aggregation application 122. If the candidate instance of digital content has been consumed by the additional computing device, the client device 102 identifies an alternative instance of digital content that has not been consumed by another member of the digital identity group. In this way, the techniques described herein support provision of digital content to a user based on an identity profile while eliminating duplicative content delivery amongst members of the digital identity group, thereby preventing resource wastage, and conserving computational and network resources.

Having discussed an example environment in which the disclosed techniques can be performed, consider now some example scenarios and implementation details for implementing the disclosed techniques.

Figure 2:
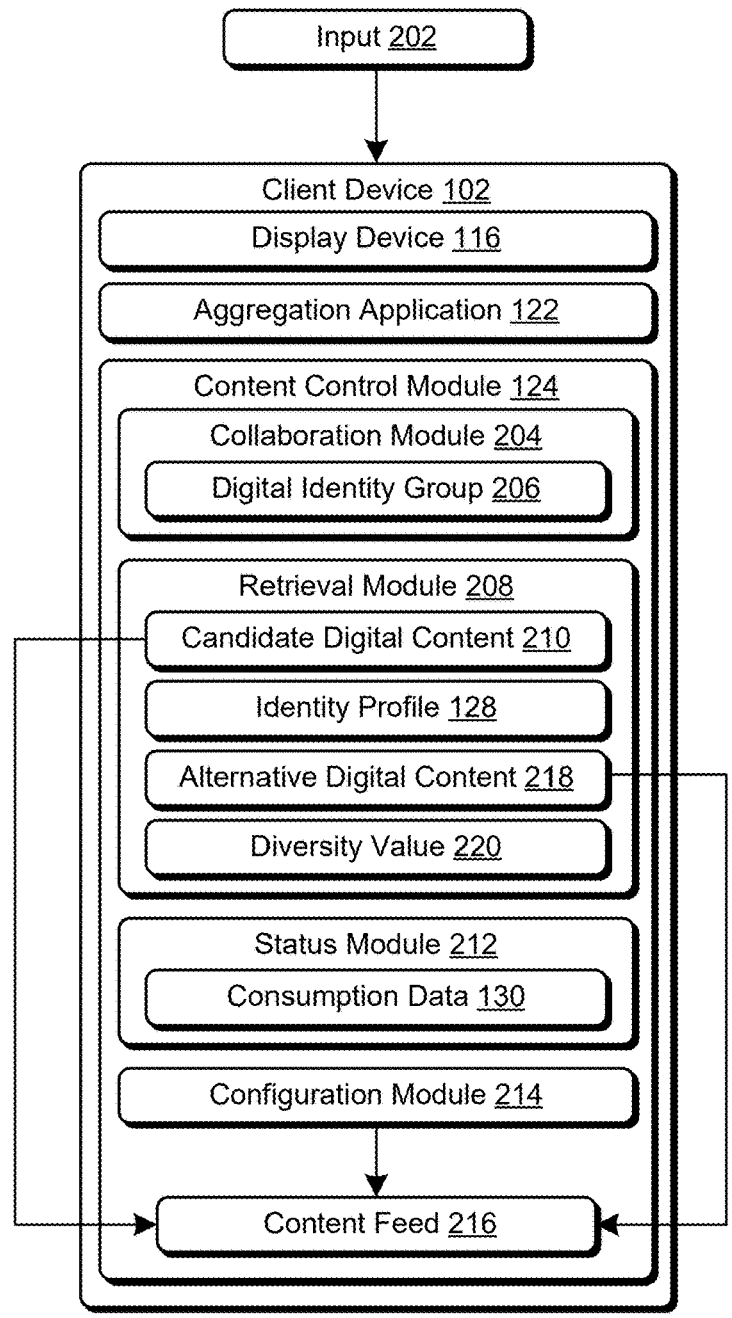
FIG. 2 depicts an example system for content recommendations based on consumption status in accordance with one or more implementations.

FIG. 2 depicts an example system 200 for content recommendations based on consumption status in accordance with one or more implementations. The system 200 can be implemented in the environment 100 and incorporates attributes of the environment 100 introduced above. In the example system 200, the content control module 124 receives an input 202, such as a user input to launch an aggregation application 122. Generally, the aggregation application 122 gathers content from various digital sources and presents selected instances of digital content in the user interface 118.

In an example, the aggregation application 122 is a news aggregator that compiles news articles, videos, editorials, etc. for display. This is by way of example and not limitation, and a variety of aggregation applications 122 are considered that gather a variety of digital content. For instance, in one example the aggregation application 122 is a video aggregator that can aggregate digital videos from a variety of video-sharing platforms. In an additional or alternative example, the aggregation application 122 is an audio content aggregator that can recommend songs, podcasts, audiobooks, etc. to a user 126. In yet another example, the aggregation application 122 is a social media aggregator that gathers various social media postings and/or digital content to create a personalized feed for the user 126. A variety of aggregation applications 122 are further considered.

The content control module 124 includes a collaboration module 204 that is operable to aggregate a set of digital identities to generate a digital identity group 206 as part of the aggregation application 122. The digital identity group 206, for instance, includes a digital identity of the user 126 of the client device 102 as well as at least one additional digital identity of an additional user of an additional client device. The digital identities, for instance, are a representation of one or more individuals, organizations, entities, and/or computing devices in a digital realm. In various examples, one or more digital identity groups 206 are maintained in the database 104.

The collaboration module 204 can generate the digital identity group 206 automatically and without user intervention, such as to include digital identities with similar digital attributes within the digital identity group 206. Alternatively or additionally, the collaboration module 204 can generate requests to join the digital identity group 206 and communicate the requests to additional client devices. For instance, the client device 102 communicates requests to join the digital identity group 206 to other computing devices associated with one or more additional individuals, e.g., friends and/or family members of the user 126. The additional individuals are then able to either accept or deny the requests.

The content control module 124 further includes a retrieval module 208 that can identify candidate digital content 210, e.g., an instance of digital content. The candidate digital content 210 can include a variety of digital content, such as text content, digital images, digital videos, audio content, AR/VR content, etc. In an example in which the aggregation application 122 is a news aggregator the candidate digital content 210 includes a digital article. The retrieval module 208 can obtain digital content from a wide range of sources, such as websites, blogs, social media platforms, news outlets, publishers, etc. For instance, the retrieval module 208 identifies the candidate digital content 210 by comparing a wide range of digital content from a variety of sources.

In various examples, the retrieval module 208 identifies candidate digital content 210 that is likely of interest to the user 126 based on an identity profile 128. The identity profile 128, for instance, includes one or more digital attributes associated with the digital identity of the user 126 such as user demographics, behavioral data, and/or user preferences. The digital attributes may alternatively or additionally include information about the client device 102, such as operating system information, hardware specifications (e.g., RAM specifications, storage capacity, graphics capabilities, etc.), system logs, application data, browser history/cookie information, sensor data, etc.

Accordingly, the retrieval module 208 can identify a candidate instance of digital content that is likely of interest to the user based on the identity profile 128. In one example, the retrieval module 208 correlates tags of digital content to the one or more digital attributes associated with the first digital identity to identify the candidate digital content 210. The tags, for instance, represent labels and/or keywords to categorize and/or organize the digital content based on characteristics, topics, attributes, etc. of the digital content. In at least one example, the retrieval module 208 leverages a machine learning model to identify patterns, correlations, and/or trends based on the identity profile 128 to identify the candidate digital content 210. In this way, the client device 102 can identify candidate digital content 210 that is likely of interest to the user 126 based on a variety of digital attributes associated with the digital identity and/or on a variety of properties of the candidate digital content 210.

The client device 102 further includes a status module 212 that can determine whether the candidate digital content 210 is a duplicative instance of digital content. The candidate digital content 210 is duplicative, for instance, if it has been consumed (e.g., accessed, read, viewed, listened to, watched, downloaded, etc.) by an additional user of an additional client device included in the digital identity group 206. In an example, the status module 212 accesses a database 104 that includes consumption data 130 for the digital identity group 206. The consumption data 130 includes a digital activity identifier that indicates a consumption status of a variety of digital content, e.g., whether the content has been consumed by a member of the digital identity group 206.

In an additional or alternative example, a digital activity indicator is associated directly with the candidate digital content 210, such as embedded in metadata of the candidate digital content 210. Accordingly, the status module 212 can detect the digital activity indicator to determine whether the candidate digital content 210 is a duplicative instance of digital content. In at least one example, the status module 212 leverages information from one or more sensors to detect whether an additional user has consumed the candidate digital content 210, e.g., by analyzing video and/or audio data to detect user behaviors that correspond to content consumption. As described in more detail below, the status module 212 is further operable to update the consumption data 130. For instance, the status module 212 updates the consumption data 130 based on a detection that the user 126 has consumed a particular instance of digital content, e.g., viewed a particular article.

In one example, the status module 212 determines that the candidate digital content 210 is not a duplicative instance of digital content. For instance, the candidate digital content 210 has not been consumed by a member of the digital identity group 206. In an example in which the candidate digital content 210 is a digital article, the status module 212 determines that the digital article has not been viewed and/or read by the one or more additional users in the digital identity group 206. Responsive to the determination that the candidate digital content 210 has not been consumed, the client device 102 leverages a configuration module 214 to generate a content feed 216 that includes the candidate digital content 210 for display in the user interface 118. Continuing the above example in which the candidate digital content 210 is a digital article, the configuration module 214 generates a content feed 216, e.g., a news feed, that includes the digital article.

In another example, the status module 212 determines that the candidate digital content 210 is a duplicative instance of digital content. For instance, the candidate digital content 210 has been consumed by another user of the digital identity group 206. Accordingly, the retrieval module 208 can identify alternative digital content 218, e.g., an alternative instance of digital content that has one or more shared digital characteristics to the candidate digital content 210. In various examples, the retrieval module 208 can obtain the alternative digital content 218 using the same or similar techniques as used to obtain the candidate digital content 210. For instance, the retrieval module 208 obtains the alternative digital content 218 based on the identity profile 128 and the one or more digital attributes.

The shared digital characteristics can include one or more of a visual similarity, audial similarity, content length, content type, content style, content format, similar topic and/or subject matter, semantic similarity, etc. The digital characteristics may also pertain to computational metrics associated with the candidate digital content 210, such as file size, resolution, duration, frame rate, page load time, file format, etc. In this way, the retrieval module 208 can identify alternative digital content 218 that has a compatible format for display with the client device 102 and/or consumes a similar and/or reduced amount of computational resources.

In one example, the retrieval module 208 determines a topic of the candidate digital content 210 and/or the alternative digital content 218. The retrieval module 208 may leverage one or more of a variety of techniques to do so, such as using keyword extraction, one or more topic modeling algorithms, one or more named entity recognition algorithms, one or more text recognition algorithms, etc. In an example in which the candidate digital content 210 is a text-based document such as an article, the retrieval module 208 identifies the alternative digital content 218, e.g., an alternative digital article, as having a same topic as the candidate digital content 210 based on a semantic similarity of the alternative digital content 218 to the candidate digital content 210. Additionally or alternatively, the retrieval module 208 performs keyword matching to identify the alternative digital content 218 as having a same topic as the candidate digital content 210.

In an example in which the candidate digital content 210 is a digital video, the retrieval module 208 identifies the alternative digital content 218, e.g., an alternative digital video, that has a visual and/or audial similarity to the candidate digital content 210 that is above a threshold amount. For instance, the retrieval module 208 can leverage one or more suitable video comparison techniques such as feature extraction, motion analysis, audio analysis, temporal alignment, etc. to identify the alternative digital video. Accordingly, the retrieval module 208 is configured to identify alternative digital content 218 for a wide range of types of digital content.

In some examples, the retrieval module 208 identifies the alternative digital content 218 based in part on a diversity value 220. Generally, the diversity value 220 controls a similarity of the alternative digital content 218 to the candidate digital content 210. For instance, a relatively low diversity value corresponds to a greater similarity between the candidate digital content 210 and the alternative digital content 218, while a relatively high diversity value corresponds to a greater diversity between the candidate digital content 210 and the alternative digital content 218. In one example, the diversity value 220 is user configurable, such as input by the user 126 in the user interface 118. Additionally or alternatively, the diversity value 220 is generated automatically and without user intervention.

Once the retrieval module 208 identifies the alternative digital content 218, the configuration module 214 generates the content feed 216 for display in the user interface 118 to include the alternative digital content 218, e.g., instead of the candidate digital content 210. In some examples, the user interface 118 further includes an indication that the alternative digital content 218 replaced the candidate digital content 210. The user interface 118 optionally includes an identity of one or more individuals from the digital identity group 206 that have consumed the candidate digital content 210 and/or a link to access the candidate digital content 210.

In an additional or alternative example, the user interface 118 includes an indication of additional digital content that has been consumed that is similar to the candidate digital content 210 and/or the alternative digital content 218. In an example in which the candidate digital content 210 and the alternative digital content 218 include a digital article, the user interface 118 indicates other articles that have been viewed by members of the digital identity group 206 that pertain to a same topic as a candidate article and/or an alternative article.

The content control module 124 can further determine whether the user 126 has consumed the candidate digital content 210 and/or the alternative digital content 218. In an example, the client device 102 leverages one or more of the content capture devices 110 to make the determination. For instance, the client device 102 leverages cameras 112 and/or audio capture devices 114 to detect a state of the user 126 during display of digital content, e.g., the candidate digital content 210 and/or the alternative digital content 218. The client device 102 can analyze video and/or audio content to detect user behaviors that indicate consumption of the candidate digital content 210 and/or the alternative digital content 218. For instance, the client device 102 leverages gaze tracking techniques to detect scanning and/or fixation behaviors of the user 126 that correspond to reading text. Additionally or alternatively, the client device 102 monitors/tracks user behavior such as page views, clicks and/or engagements, display time, scrolling behavior, video views, etc. to make the determination.

The content control module 124 can then update a digital activity indicator that indicates a consumption status of the candidate digital content 210 and/or the alternative digital content 218. For instance, the client device 102 generates consumption data 130 associated with the alternative digital content 218 and/or the candidate digital content 210 that indicates that the user 126 has consumed the alternative digital content 218 and/or the candidate digital content 210. Accordingly, the techniques described herein support generation of digital identity groups 206 that enhance a content consumption user experience by providing diverse digital content to members of the digital identity group 206. Further, the techniques described herein eliminate redundant content delivery to members of the digital identity group 206, thereby conserving computational and network resources.

Figure 3:
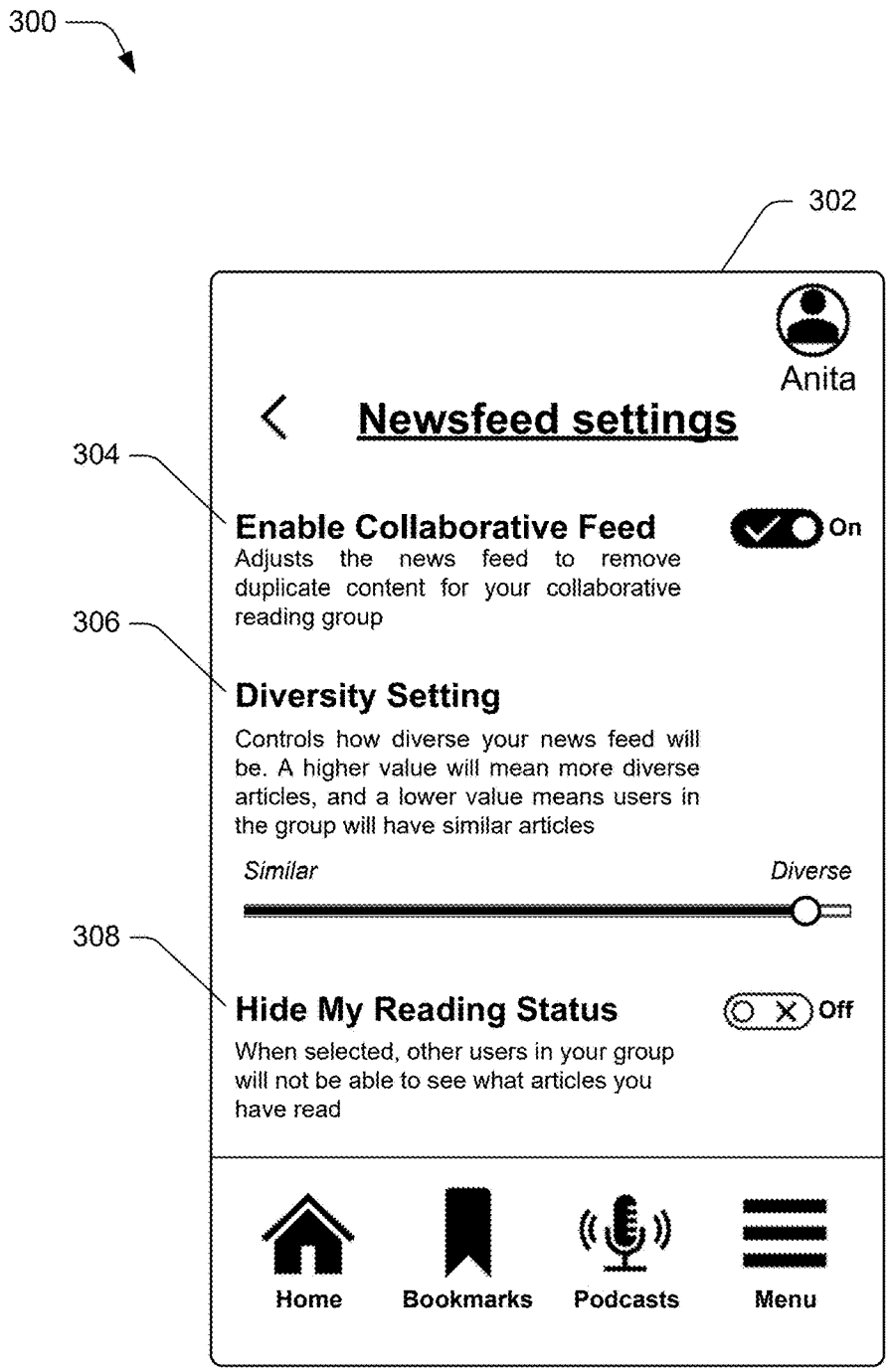
FIG. 3 depicts an example implementation for content recommendations based on consumption status in which a graphical user interface is displayed in accordance with one or more implementations.

FIG. 3 depicts an example implementation 300 for content recommendations based on consumption status in which a graphical user interface is displayed in accordance with one or more implementations. In this example, the display device 116 of the client device 102 displays a graphical user interface 302 of an aggregation application 122. The aggregation application 122 in this example is a news aggregator that displays a content feed 216, e.g., a newsfeed, of digital articles for the user 126.

The graphical user interface 302 displays settings to configure the newsfeed. For instance, the graphical user interface 302 includes a collaborative feed setting 304, a diversity setting 306, and a status visibility setting 308. The collaborative feed setting 304 controls generation of the content feed 216 to include non-duplicative digital content that has not been consumed by other members of the digital identity group 206. For instance, turning the collaboration module 204 "On" initiates functionality of the content control module 124.

The diversity setting 306 includes a slider that corresponds to a diversity value 220. As described above, the diversity value 220 controls a similarity of the alternative digital content 218 to the candidate digital content 210. For instance, a relatively low diversity value corresponds to a greater similarity between the candidate digital content 210 and the alternative digital content 218, while a relatively high diversity value corresponds to a greater diversity between the candidate digital content 210 and the alternative digital content 218. In this example, the diversity setting 306 is adjusted to the right, which corresponds to a greater diversity between candidate digital content 210, e.g., a candidate article, and the alternative digital content 218, e.g., an alternative article.

The status visibility setting 308 is an interactive element in the user interface 118 that controls whether other members of the digital identity group 206 are able to view content consumption behavior of the user 126. For instance, selection of the status visibility setting 308, e.g., turning the status visibility setting 308 "On," prevents the additional users in the digital identity group 206 from viewing that the user 126 has consumed the candidate article and/or the alternative article. In the illustrated example, the status visibility setting 308 is turned "Off," thus the other members of the digital identity group 206 are able to view whether or not the user 126 has viewed the candidate article and/or the alternative article.

Figure 4:
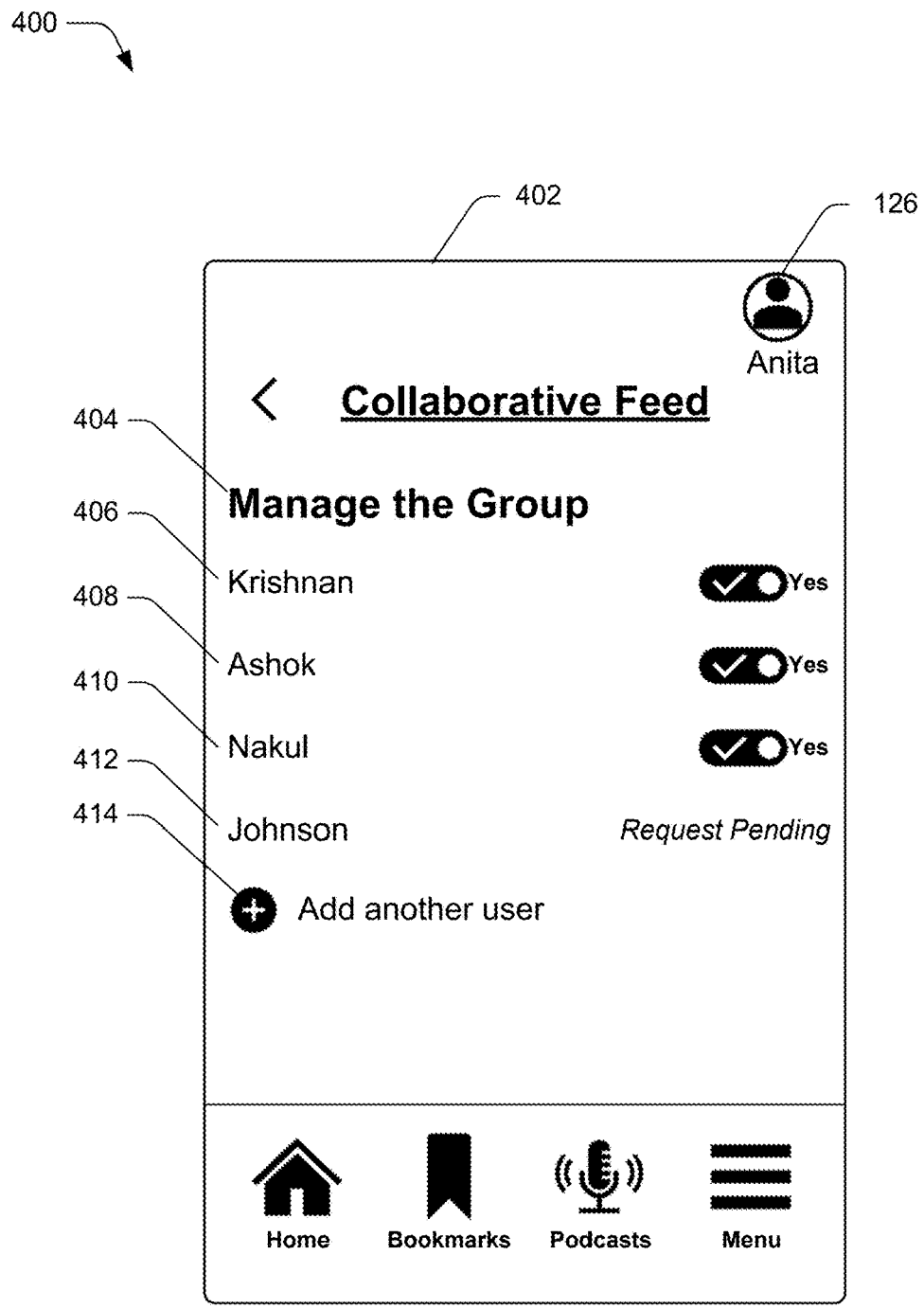
FIG. 4 depicts an example implementation for content recommendations based on consumption status in which a graphical user interface is displayed in accordance with one or more implementations.

FIG. 4 depicts an example implementation 400 for content recommendations based on consumption status in which a graphical user interface is displayed in accordance with one or more implementations. This example is a continuation of the example described above with respect to FIG. 3. In this example, the display device 116 displays a graphical user interface 402 that includes settings to manage the collaborative feed.

The graphical user interface 402 includes a group management setting 404 that is configurable to control "who" is included in the digital identity group 206. Along with the user 126 "Anita," in this example digital identities associated with a first user 406, a second user 408, and a third user 410 have accepted requests to join the digital identity group 206. However, a digital identity associated with a fourth user 412 has not yet accepted a request to join the digital identity group 206 and accordingly has a "pending" status. The graphical user interface 402 further includes an option 414 to add additional users to the digital identity group 206. Selection of the option 414, for instance, causes the client device 102 to communicate a request to an additional user to join the digital identity group 206.

Figure 5:
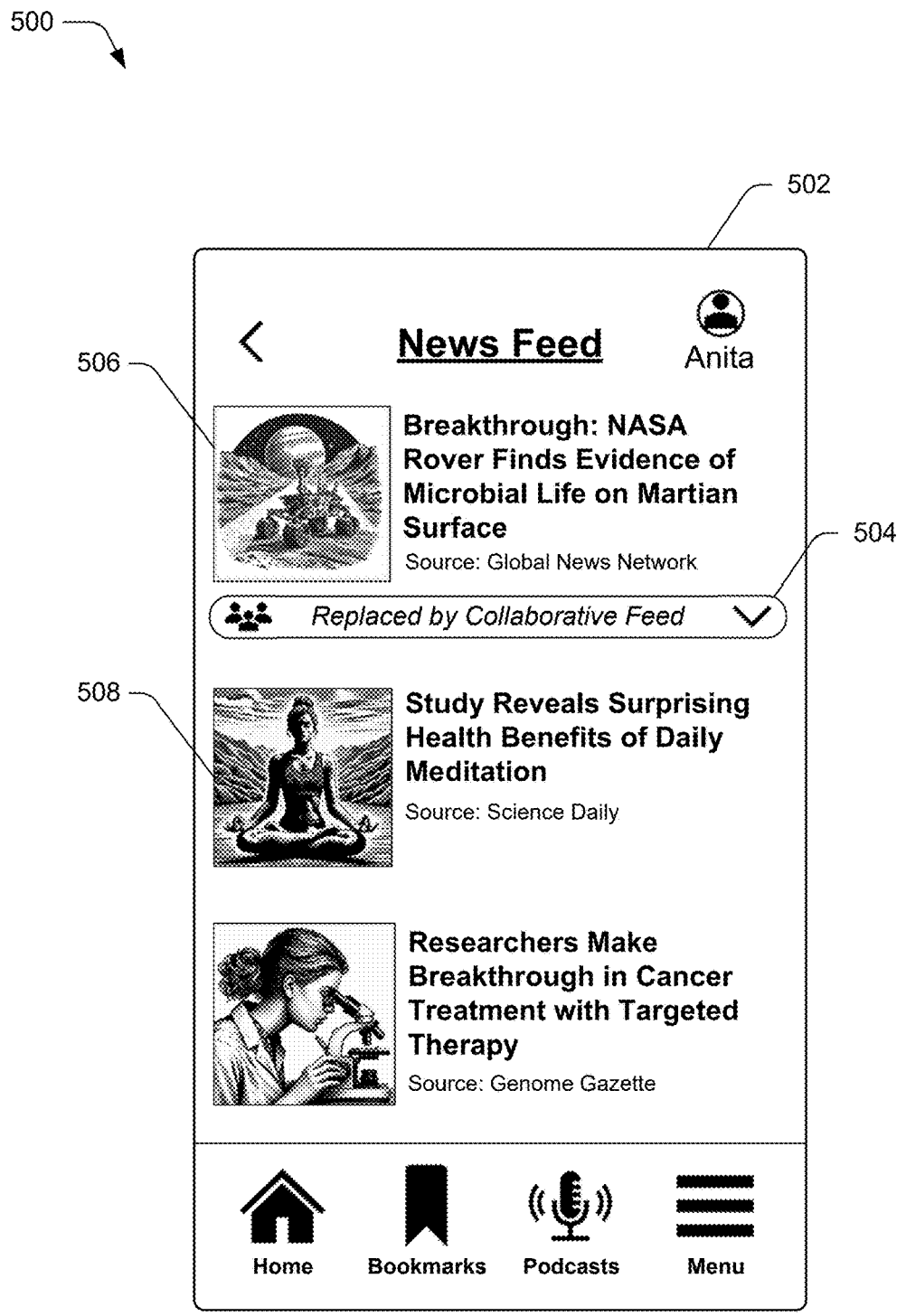
FIG. 5 depicts an example implementation for content recommendations based on consumption status in which a graphical user interface is displayed in accordance with one or more implementations.

FIG. 5 depicts an example implementation 500 for content recommendations based on consumption status in which a graphical user interface is displayed in accordance with one or more implementations. This example is a continuation of the example described above with respect to FIG. 3 and FIG. 4 above. In this example, the display device 116 displays a graphical user interface 502 that includes a collaborative news feed with several digital articles displayed. The articles are selected for display in the graphical user interface 502 in accordance with the techniques described herein.

The graphical user interface 502 includes an indication 504 that the top article 506, which pertains to a purported discovery of microbial life on Mars, replaced a different article using a collaborative feed feature. The indication 504, for instance, indicates that the candidate article has been replaced by the alternative article 506 in accordance with the techniques described herein. Further, because the article 508 does not include an indication 504, the article 508 has not been replaced, e.g., the article 508 has not been read by another member of the digital identity group 206. The indication 504 further includes a "drop-down arrow" that is selectable to view supplemental information. Thus, the techniques described herein prevent duplicative content delivery to members of the digital identity group 206.

Figure 6:
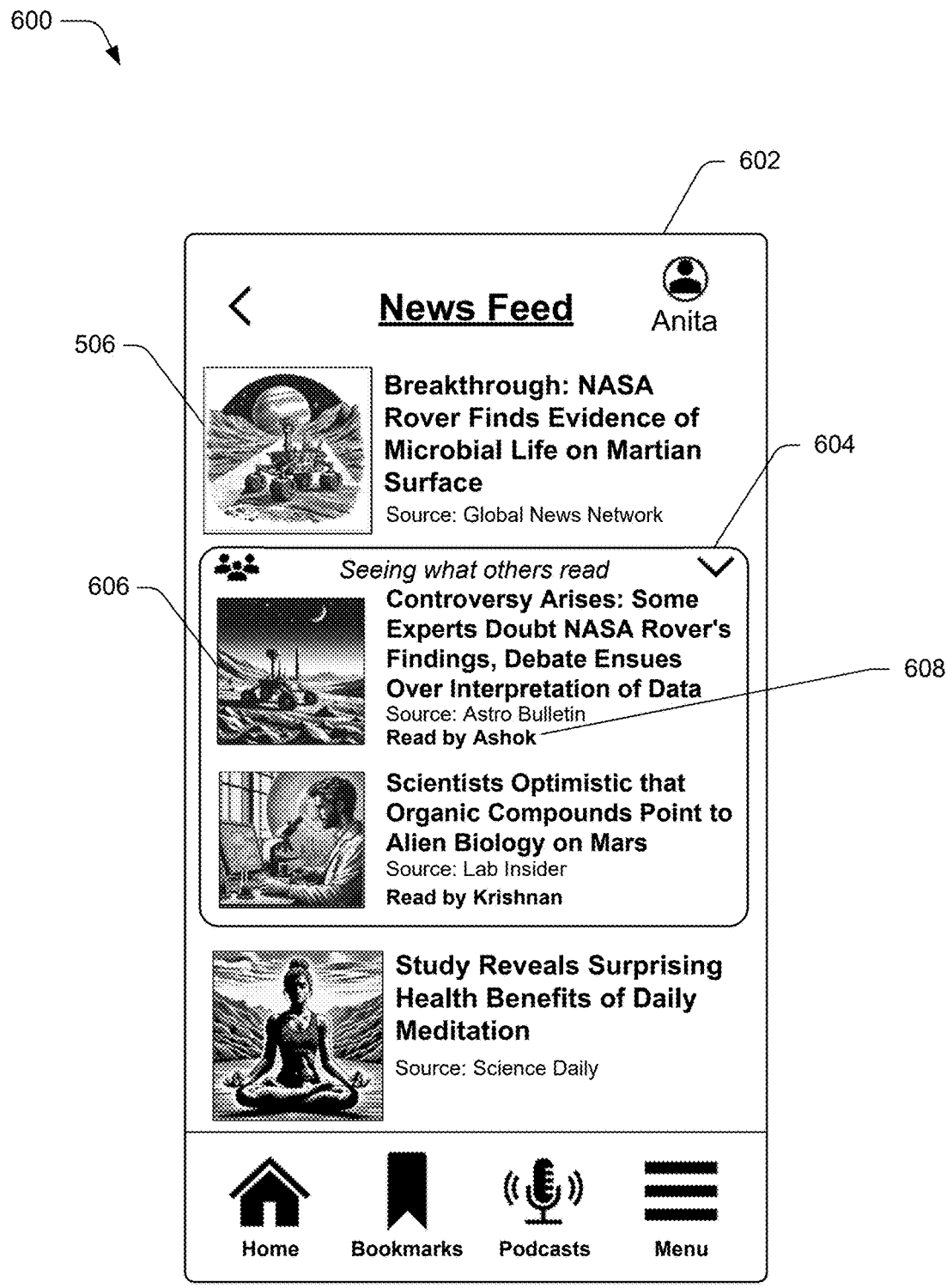
FIG. 6 depicts an example implementation for content recommendations based on consumption status in which a graphical user interface is displayed in accordance with one or more implementations.

FIG. 6 depicts an example implementation 600 for content recommendations based on consumption status in which a graphical user interface is displayed in accordance with one or more implementations. This example is a continuation of the example described above with respect to FIG. 3, FIG. 4, and FIG. 5 above. In this example, the display device 116 displays a graphical user interface 602 that includes the collaborative news feed. The graphical user interface 602, for instance, is representative of selecting the drop-down arrow associated with the indication 504 to view supplemental information.

The graphical user interface 602 includes an expanded region 604 that includes articles of a similar topic that were viewed by other members of the digital identity group 206. For instance, an article 606 similarly pertains to the purported discovery of life on Mars, however is a different article from a different source. The graphical user interface 602 further includes an indication 608 of a digital identity associated with a user in the digital identity group 206 that consumed the article 606. In this example, the article 606 is representative of a candidate article for the user 126 of the client device 102, which was replaced by the alternative article 506. In this way, the users of the digital identity group 206 are each presented with an article that pertains to the same topic and has not been read by the other members of the digital identity group 206.

Figure 7:
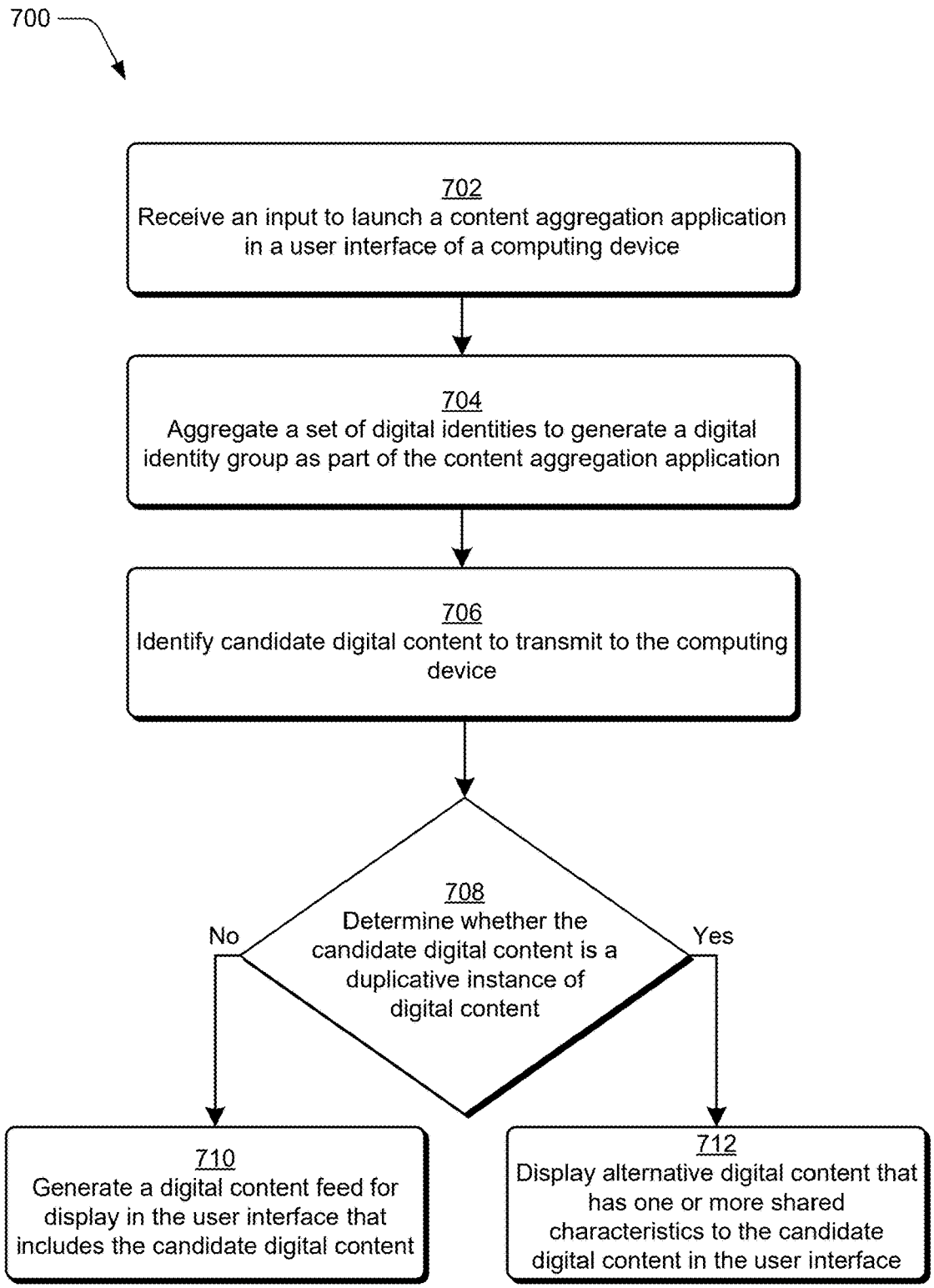
FIG. 7 illustrates a flow chart depicting an example method for content recommendations based on consumption status in accordance with one or more implementations.

FIG. 7 illustrates a flow chart depicting an example method 700 for content recommendations based on consumption status in accordance with one or more implementations. Operations of the method 700, for instance, may be performed in the context of the environment 100, such as by the client device 102.

At 702, an input is received to launch a content aggregation application. The aggregation application 122, for instance, gathers content from various digital sources and presents selected instances of digital content in a user interface 118 of a client device 102. A variety of aggregation applications 122 are considered that gather a variety of digital content, such as news aggregators that compile news articles, social media aggregators that gather various social media postings, video aggregators that compile digital videos from various platforms, content consumption aggregators that aggregate content consumption statistics, etc.

At 704, a set of digital identities are aggregated to form a digital identity group. The digital identity group 206, for instance, is generated as part of the content aggregation application. In an example, the digital identity group 206 includes a first digital identity of the user 126 of the client device 102 and a second digital identity of an additional user of an additional client device. The digital identities, for instance, are a representation of one or more individuals, organizations, entities, and/or computing devices in a digital realm.

At 706, candidate digital content is identified to transmit to the computing device. For instance, the candidate digital content 210 is recommended to a user based on an identity profile 128 associated with the first digital identity. The identity profile 128, for instance, includes one or more digital attributes associated with the digital identity of the user 126 such as demographic data, behavioral data, and/or preferences data. The digital attributes may alternatively or additionally include information about the client device 102, such as operating system information, hardware specifications (e.g., RAM specifications, storage capacity, graphics capabilities, etc.), system logs, application data, browser history/cookie information, sensor data, etc.

In one example, the client device 102 correlates tags of digital content to the one or more digital attributes associated with the first digital identity to identify the candidate digital content 210. The tags, for instance, represent labels and/or keywords assigned to digital content to categorize and/or organize the digital content based on characteristics, topics, attributes, etc. Accordingly, the retrieval module 208 can identify a candidate instance of digital content that is likely of interest to the user based on a positive correlation of the tags to the one or more digital attributes.

At 708, it is determined whether the candidate digital content is a duplicative instance of digital content. The candidate digital content 210 is duplicative, for instance, if it has been consumed (e.g., accessed, read, viewed, listened to, watched, downloaded, etc.) by an additional user of an additional client device included in the digital identity group 206. In an example, the determination is based on a digital activity indicator associated with the candidate digital content 210. The digital activity indicator, for instance, is based on content consumption behavior of the digital identity group 206 and indicates whether a particular instance of digital content article has been consumed by a member of the digital identity group 206.

If the candidate digital content is not a duplicative instance of digital content ("No"), at 710 a content feed is generated for display in the user interface that includes the candidate digital content. In some examples, the user interface 118 further includes an indication of additional digital content that has one or more shared digital characteristics to the candidate digital content 210.

If the candidate digital content is a duplicative instance of digital content ("Yes"), at 712 alternative digital content is displayed has one or more shared digital characteristics to the candidate digital content in the user interface. The shared digital characteristics can include one or more of a visual similarity, audial similarity, content length, content type, content style, content format, similar topic and/or subject matter, semantic similarity, etc. The digital characteristics may also pertain to computational metrics associated with the candidate digital content 210, such as file size, resolution, duration, frame rate, page load time, file format, etc. In this way, the retrieval module 208 can identify alternative digital content 218 that has a compatible format for display with the client device 102 and/or consumes a similar and/or reduced amount of computational resources.

Figure 8:
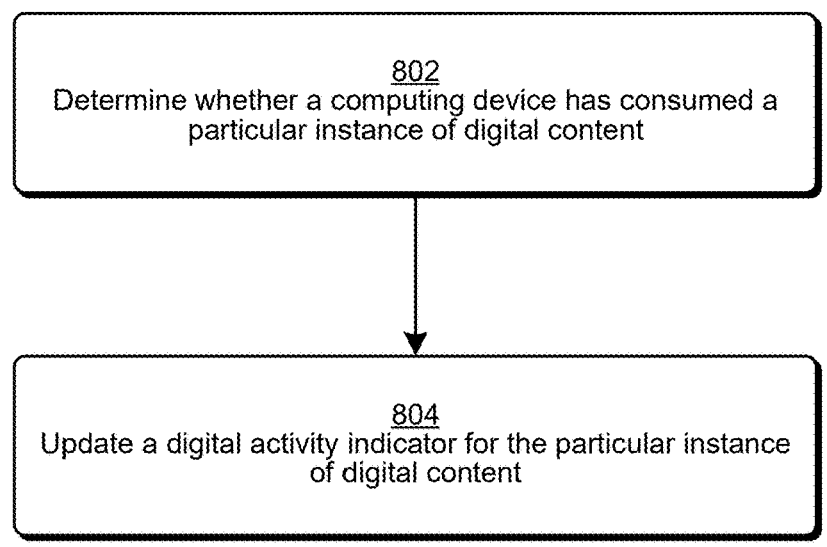
FIG. 8 illustrates a flow chart depicting an example method for content recommendations based on consumption status in accordance with one or more implementations.

FIG. 8 illustrates a flow chart depicting an example method 800 for content recommendations based on consumption status in accordance with one or more implementations. Operations of the method 800, for instance, may be performed in the context of the environment 100, such as by the client device 102.

At 802, it is determined whether a computing device has consumed a particular instance of digital content. For instance, the client device 102 monitors operations and/or interactions within the aggregation application 122 to determine whether or not a user 126 has consumed (e.g., accessed, downloaded, read, viewed, watched, etc.) the candidate digital content 210 and/or the alternative digital content 218. In an additional or alternative example, the client device 102 leverages one or more content capture devices 110 to determine whether the particular instance of digital content has been consumed. For instance, the client device 102 leverages cameras 112 and/or audio capture devices 114 to detect a state of the user 126 during display of digital content, e.g., the candidate digital content 210 and/or the alternative digital content 218. The client device 102 can analyze video and/or audio content to detect user behaviors that indicate consumption of the candidate digital content 210 and/or the alternative digital content 218.

At 804, a digital activity indicator is updated for the particular instance of digital content. The digital activity indicator, for instance, indicates whether the particular instance of digital content article has been consumed by a member of the digital identity group 206. In one example, the client device 102 embeds the updated digital activity indicator within the particular instance of digital content, e.g., within metadata of the candidate digital content 210 and/or the alternative digital content 218. Alternatively or additionally, the client device 102 stores the digital activity indicator as part of consumption data 130, e.g., within a database 104.

Figure 9:
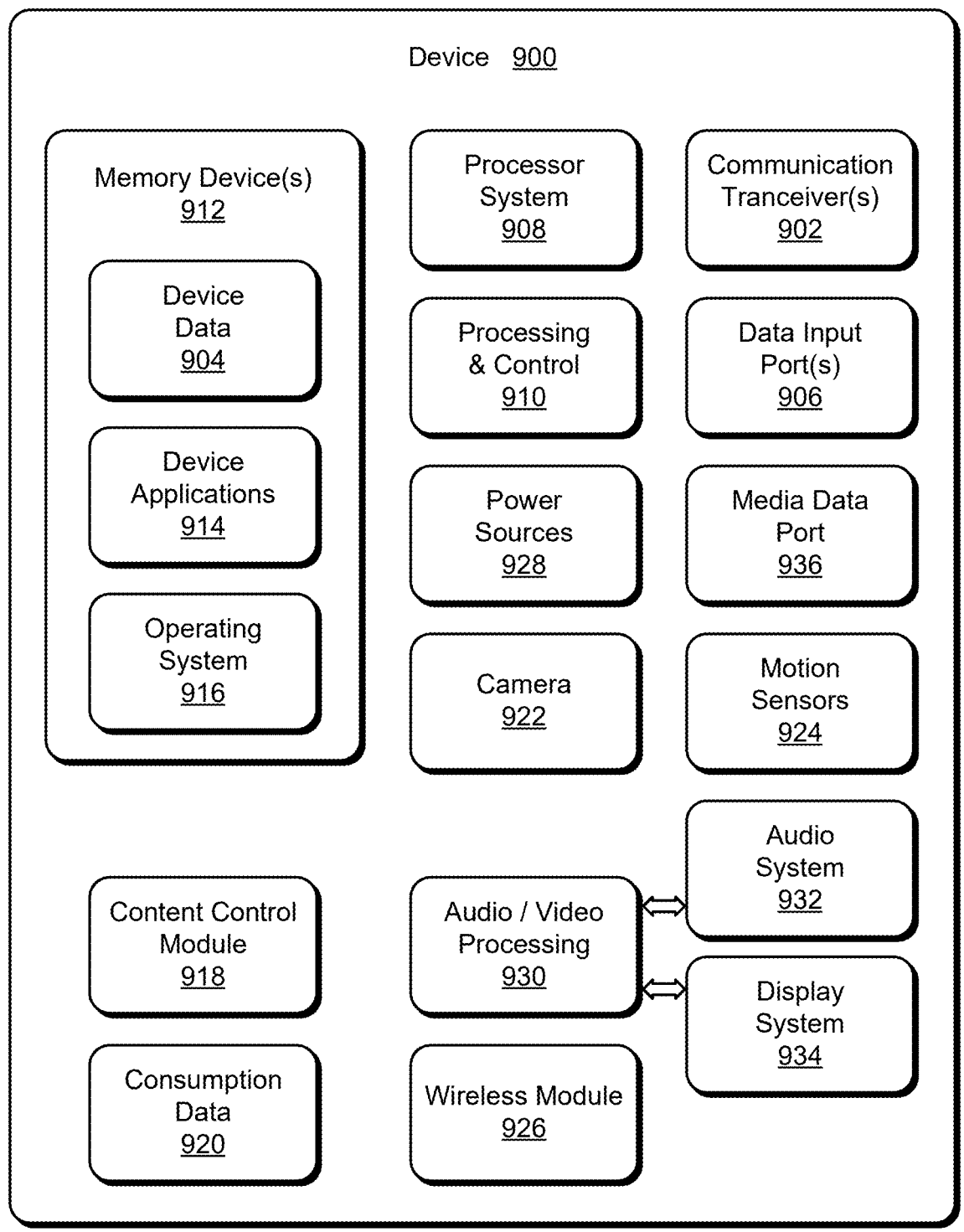
FIG. 9 illustrates various components of an example device in which aspects of content recommendations based on consumption status can be implemented.

FIG. 9 illustrates various components of an example device 900 in which aspects of content recommendations based on consumption status can be implemented. The example device 900 can be implemented as any of the devices described with reference to the previous FIGS. 1-8, such as any type of mobile device, mobile phone, mobile device, wearable device, tablet, computing, communication, entertainment, gaming, media playback, and/or other type of electronic device. For example, the client device 102 as shown and described with reference to FIGS. 1-8 may be implemented as the example device 900.

The device 900 includes communication transceivers 902 that enable wired and/or wireless communication of device data 904 with other devices. The device data 904 can include any of device identifying data, device location data, wireless connectivity data, and wireless protocol data. Additionally, the device data 904 can include any type of audio, video, and/or image data. Example communication transceivers 902 include wireless personal area network (WPAN) radios compliant with various IEEE 902.15 (Bluetooth™) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 900 may also include a mass storage media device.

The computer-readable storage memory 912 provides data storage mechanisms to store the device data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a content control module 918 that implements aspects of content recommendations based on consumption status and may be implemented with hardware components and/or in software as one of the device applications 914. In an example, the content control module 918 can be implemented as the content control module 124 described in detail above. In implementations, the content control module 918 may include independent processing, memory, and logic components as a computing and/or electronic device integrated with the device 900. The device 900 also includes consumption data 920 for implementing aspects of content recommendations based on consumption status and may include data from and/or utilized by the content control module 918.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. For instance, for the client device 102, the wireless module 926 can be leveraged to scan for and detect wireless networks, as well as negotiate wireless connectivity to wireless networks for the client device 102. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of content recommendations based on consumption status have been described in language specific to features and/or methods, the subject of the appended claims is not necessarily limited to the specific features or methods described. Rather, the features and methods are disclosed as example implementations of content recommendations based on consumption status, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a display device configured to display a user interface; and a content control module implemented at least partially in hardware and configured to: receive an input to launch a content aggregation application in the user interface; aggregate a set of digital identities to generate a digital identity group as part of the content aggregation application, the digital identity group including a first digital identity of a user of the computing device and a second digital identity of an additional user of an additional computing device; identify candidate digital content to transmit to the computing device based on one or more digital attributes associated with the first digital identity; determine whether the candidate digital content is a duplicative instance of digital content based on a digital activity indicator associated with the candidate digital content, the digital activity indicator based on content consumption of the digital identity group; and display, responsive to a determination that the candidate digital content is a duplicative instance of digital content, alternative digital content that has one or more shared digital characteristics to the candidate digital content in the user interface.

In some aspects, the techniques described herein relate to a computing device, wherein the content control module identifies the candidate digital content by correlating tags of the candidate digital content to the one or more digital attributes associated with the first digital identity.

In some aspects, the techniques described herein relate to a computing device, wherein the one or more digital attributes include one or more instances of demographic data, behavioral data, or preference data associated with the first digital identity.

In some aspects, the techniques described herein relate to a computing device, wherein the candidate digital content includes text-based digital content and the content control module is configured to identify the alternative digital content based on a semantic similarity to the candidate digital content.

In some aspects, the techniques described herein relate to a computing device, wherein the content control module is further configured to perform keyword matching to identify the alternative digital content as having a same topic as the candidate digital content.

In some aspects, the techniques described herein relate to a computing device, wherein the digital activity indicator is stored in metadata associated with the candidate digital content and indicates whether the additional computing device has consumed the candidate digital content.

In some aspects, the techniques described herein relate to a computing device, wherein the content control module is further configured to update a digital activity indicator for the alternative digital content based on a determination of whether the computing device has consumed the alternative digital content.

In some aspects, the techniques described herein relate to a computing device, wherein the content control module is further configured to display, in the user interface, a digital content feed that includes the alternative digital content and an indication that the alternative digital content replaced the candidate digital content.

In some aspects, the techniques described herein relate to a computing device, wherein the alternative digital content is based in part on a diversity value that determines a similarity of the alternative digital content to the candidate digital content.

In some aspects, the techniques described herein relate to a computing device, including: a display device configured to display a user interface; and a content control module implemented at least partially in hardware and configured to: aggregate, as part of a news aggregation application displayed in the user interface, a set of digital identities to generate a digital identity group including a first digital identity of a user of the computing device and a second digital identity of an additional user of an additional computing device; identify candidate digital content to transmit to the computing device based on one or more digital attributes associated with the first digital identity; determine whether the candidate digital content is a duplicative instance of digital content based on a digital activity indicator associated with the candidate digital content, the digital activity indicator based on content consumption of the digital identity group; and generate, responsive to a determination that the candidate digital content is not a duplicative instance of digital content, a digital content feed for display in the user interface that includes the candidate digital content.

In some aspects, the techniques described herein relate to a computing device, wherein the content control module identifies the candidate digital content by correlating tags of the candidate digital content to the one or more digital attributes associated with the first digital identity.

In some aspects, the techniques described herein relate to a computing device, wherein the one or more digital attributes include one or more instances of demographic data, behavioral data, or preference data associated with the first digital identity.

In some aspects, the techniques described herein relate to a computing device, wherein the digital activity indicator is stored in metadata associated with the candidate digital content and indicates whether the additional computing device has consumed the candidate digital content.

In some aspects, the techniques described herein relate to a computing device, wherein the content control module is further configured to update the digital activity indicator for the candidate digital content based on a determination that the computing device has accessed the candidate digital content.

In some aspects, the techniques described herein relate to a computing device, wherein the user interface includes an interactive element and selection of the interactive element prevents display of the digital activity indicator by the additional computing device.

In some aspects, the techniques described herein relate to a method, including: generating a digital identity group within a content aggregation application by aggregating a set of digital identities, the digital identity group including a first digital identity of a user of a computing device and a second digital identity of an additional user of an additional computing device; identifying candidate digital content to transmit to the computing device based on one or more digital attributes associated with the first digital identity; determining whether the candidate digital content is a duplicative instance of digital content based on content consumption of the digital identity group; and displaying, responsive to a determination that the candidate digital content is a duplicative instance of digital content, alternative digital content that has one or more shared digital characteristics to the candidate digital content in a user interface of the computing device.

In some aspects, the techniques described herein relate to a method, wherein the candidate digital content includes text-based digital content and the alternative digital content is semantically similar to the candidate digital content.

In some aspects, the techniques described herein relate to a method, further including determining that the alternative digital content is semantically similar to the candidate digital content using a named entity recognition algorithm.

In some aspects, the techniques described herein relate to a method, wherein the candidate digital content includes one or more digital images or digital videos and the alternative digital content is visually and audially similar to the candidate digital content.

In some aspects, the techniques described herein relate to a method, wherein the determining whether the candidate digital content is a duplicative instance of digital content is based on a digital activity indicator stored in metadata associated with the candidate digital content that indicates whether the additional computing device has consumed the candidate digital content.

The invention claimed is:

1. A computing device, comprising:
a display device configured to display a user interface; and
a content control module implemented at least partially in hardware and configured to:
receive an input to launch a content aggregation application in the user interface;
aggregate a set of digital identities to generate a digital identity group as part of the content aggregation application that includes a first digital identity of a user of the computing device and a second digital identity of an additional user of an additional computing device;
identify candidate digital content to transmit to the computing device based on one or more digital attributes associated with the first digital identity;
determine whether the candidate digital content is a duplicative instance of digital content that has been consumed by the additional user of the digital identity group based on a first digital activity indicator embedded within metadata of the candidate digital content that indicates a consumption status of the candidate digital content;

present, in the user interface and responsive to a determination that the candidate digital content is the duplicative instance of the digital content, alternative digital content that has one or more shared digital characteristics to the candidate digital content, the alternative digital content identified based in part on a diversity value that controls a similarity of the alternative digital content to the candidate digital content; and embed a second digital activity indicator within metadata of the alternative digital content that indicates a consumption status of the alternative digital content based in part on a user state detected by one or more sensors of the computing device during display of the alternative digital content.

2. The computing device as described in claim 1, wherein the content control module identifies the candidate digital content by correlating tags of the candidate digital content to the one or more digital attributes associated with the first digital identity.

3. The computing device as described in claim 1, wherein the one or more digital attributes include one or more instances of demographic data, behavioral data, or preference data associated with the first digital identity.

4. The computing device as described in claim 1, wherein the candidate digital content includes text-based digital content and the content control module is configured to identify the alternative digital content based on a semantic similarity to the candidate digital content.

5. The computing device as described in claim 4, wherein the content control module is further configured to perform keyword matching to identify the alternative digital content as having a same topic as the candidate digital content.

6. The computing device as described in claim 1, wherein the content control module is further configured to display, in the user interface, a digital content feed that includes the alternative digital content and an indication that the alternative digital content replaced the candidate digital content.

7. The computing device as described in claim 1, wherein the content control module determines whether the candidate digital content is duplicative by analyzing video and audio data to detect one or more user behaviors that correspond to content consumption of the candidate digital content by the additional user.

8. The computing device as described in claim 1, wherein the content control module is further configured to implement gaze tracking to detect a scanning behavior of the user of the computing device that corresponds to reading text to determine the user state, and the second digital activity indicator is updated to indicate consumption of the alternative digital content by the user.

9. A computing device, comprising:
a display device configured to display a user interface; and
a content control module implemented at least partially in hardware and configured to:
aggregate, as part of a content aggregation application displayed in the user interface, a set of digital identities to generate a digital identity group including a first digital identity of a user of the computing device and a second digital identity of an additional user of an additional computing device;

identify candidate digital content to transmit to the computing device based on one or more digital attributes associated with the first digital identity;

determine whether the candidate digital content is a duplicative instance of digital content that has been consumed by the additional user of the digital identity group based on a digital activity indicator embedded within metadata of the candidate digital content that indicates a consumption status of the candidate digital content;

generate, responsive to a determination that the candidate digital content is not the duplicative instance of the digital content, a digital content feed for display in the user interface that includes the candidate digital content;

detect, using one or more sensors of the computing device, a user state that indicates whether the user of the computing device has consumed the candidate digital content; and update the digital activity indicator embedded within the metadata of the candidate digital content based on the detected user state.

10. The computing device as described in claim 9, wherein the content control module identifies the candidate digital content by correlating tags of the candidate digital content to the one or more digital attributes associated with the first digital identity.

11. The computing device as described in claim 10, wherein the one or more digital attributes include one or more instances of demographic data, behavioral data, or preference data associated with the first digital identity.

12. The computing device as described in claim 9, wherein the user interface includes an interactive element and selection of the interactive element prevents display of the digital activity indicator by the additional computing device.

13. The computing device as described in claim 9, wherein the one or more sensors include at least one camera and at least one audio capture device, and the content control module is further configured to leverage the at least one camera and the at least one audio capture device during display of the candidate digital content to detect that the user state indicates the user has consumed the candidate digital content.

14. The computing device as described in claim 9, wherein the content control module further monitors a user behavior as part of an interaction with the candidate digital content within the user interface to detect whether the user of the computing device has consumed the candidate digital content.

15. A method, comprising:
generating a digital identity group within a content aggregation application by aggregating a set of digital identities, the digital identity group including a first digital identity of a user of a computing device and a second digital identity of an additional user of an additional computing device;

identifying candidate digital content to transmit to the computing device based on one or more digital attributes associated with the first digital identity;

generating a determination that the candidate digital content is a duplicative instance of digital content that has been consumed by the additional user of the digital identity group based on a first digital activity indicator embedded in metadata of the candidate digital content that indicates a consumption status of the candidate digital content;

presenting, by the computing device and responsive to the determination, alternative digital content that has one or more shared digital characteristics to the candidate digital content, the alternative digital content identified based in part on a diversity value that controls a similarity of the alternative digital content to the candidate digital content; and embedding, based on a user state detected by one or more sensors of the computing device, a second digital activity indicator within metadata of the alternative digital content that indicates a consumption status of the alternative digital content.

16. The method as described in claim 15, wherein the candidate digital content includes text-based digital content and the alternative digital content is semantically similar to the candidate digital content.

17. The method as described in claim 16, further comprising determining that the alternative digital content is semantically similar to the candidate digital content using a named entity recognition algorithm.

18. The method as described in claim 15, wherein the candidate digital content includes one or more digital images or digital videos and the alternative digital content is visually and audially similar to the candidate digital content.

19. The method as described in claim 15, further comprising: detecting, based on video data collected by the one or more sensors of the computing device, that the user of the computing device has consumed the alternative digital content; and updating the second digital activity indicator to indicate the alternative digital content has been consumed by the user.

20. The method as described in claim 15, wherein the alternative digital content is identified based on a similarity between one or more computational metrics of the candidate digital content and one or more computational metrics of the alternative digital content such that presentation of the alternative digital content by the computing device includes consumption of a substantially similar or a reduced amount of computational resources relative to presentation of the candidate digital content by the computing device.

* * * * *